Nov. 17, 1931. J. F. RAU 1,832,424
SKIVING APPARATUS
Filed Sept.. 16, 1927 10 Sheets-Sheet 4

Witness:
William P. Kilroy

Inventor:
John F. Rau
Hill & Hill
Attys

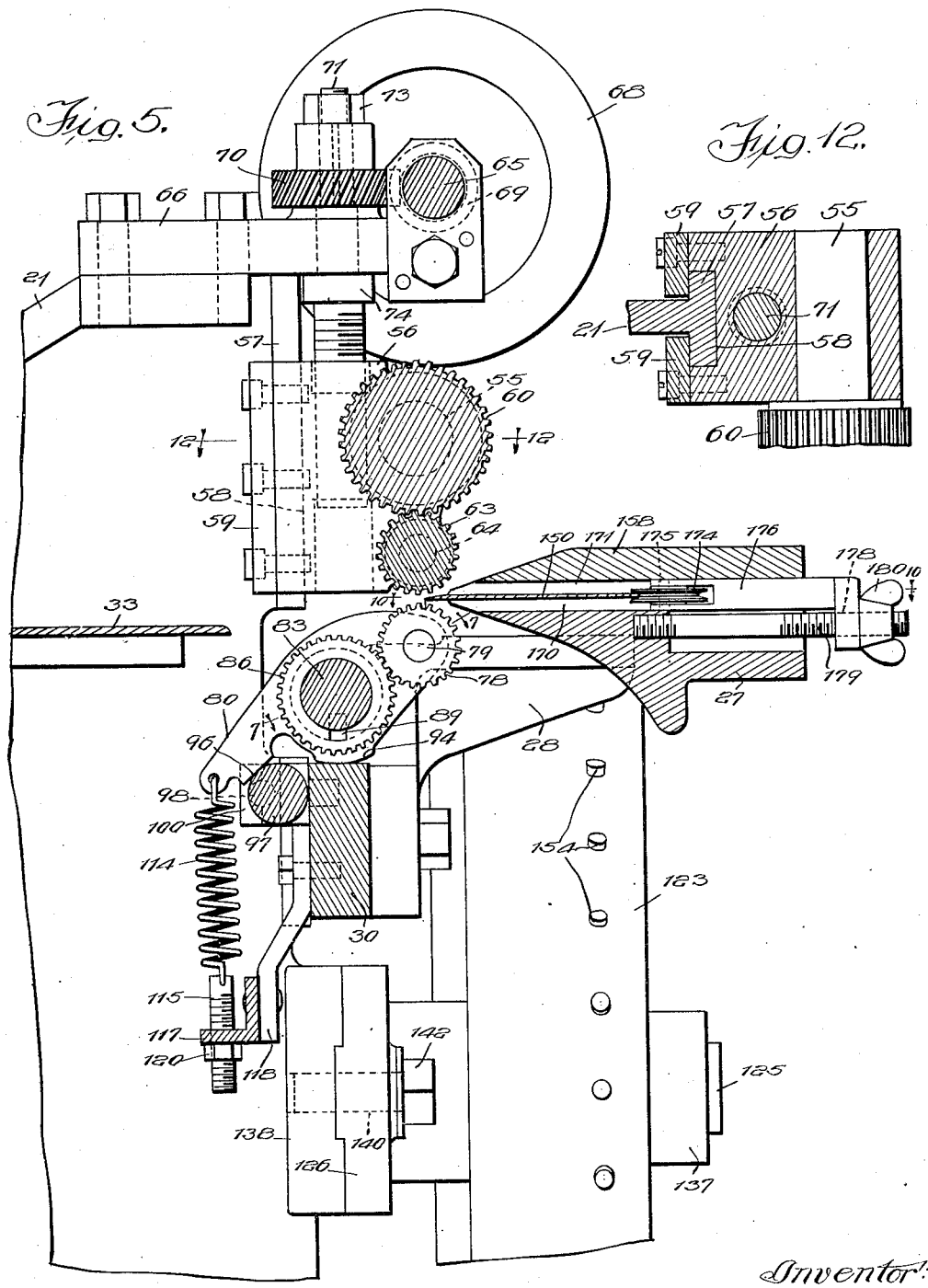

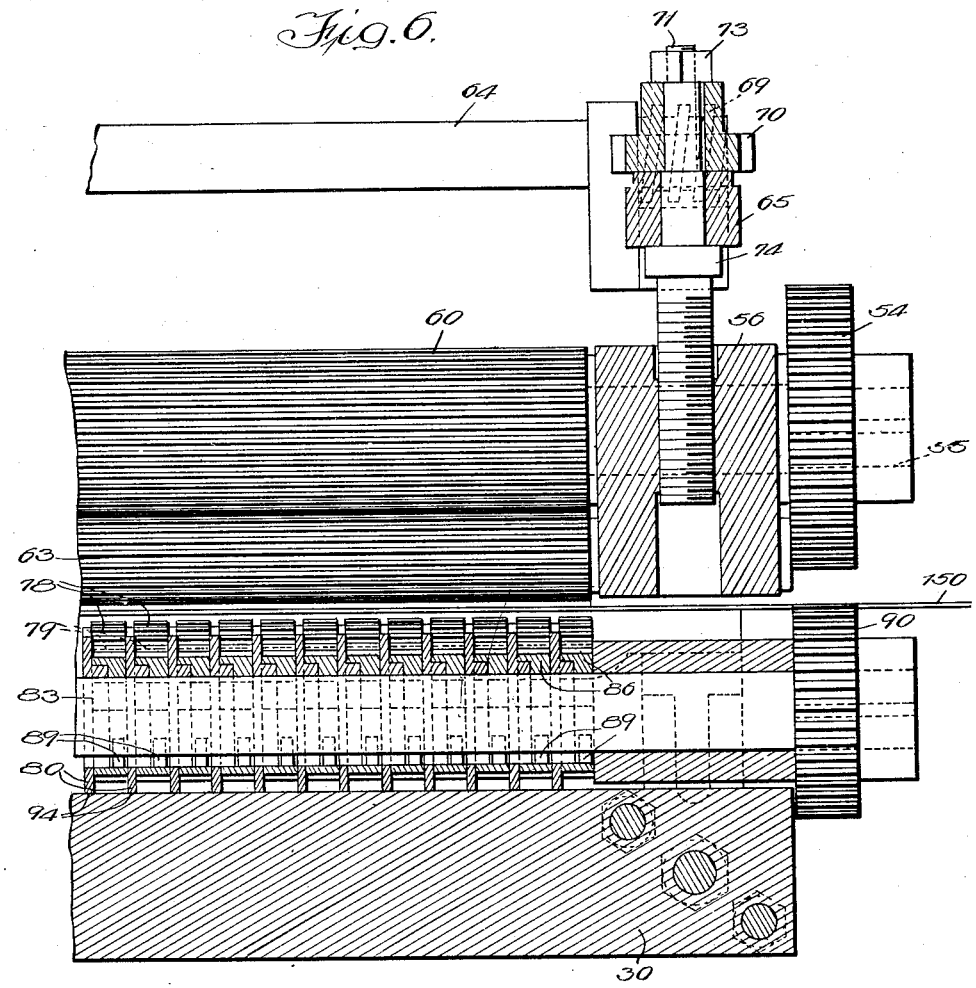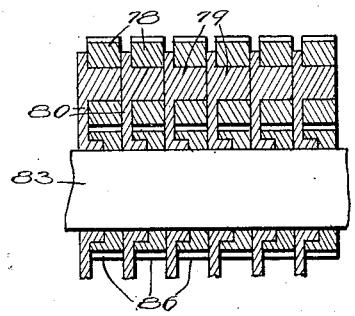

Nov. 17, 1931.  J. F. RAU  1,832,424
SKIVING APPARATUS
Filed Sept. 16, 1927    10 Sheets-Sheet 7
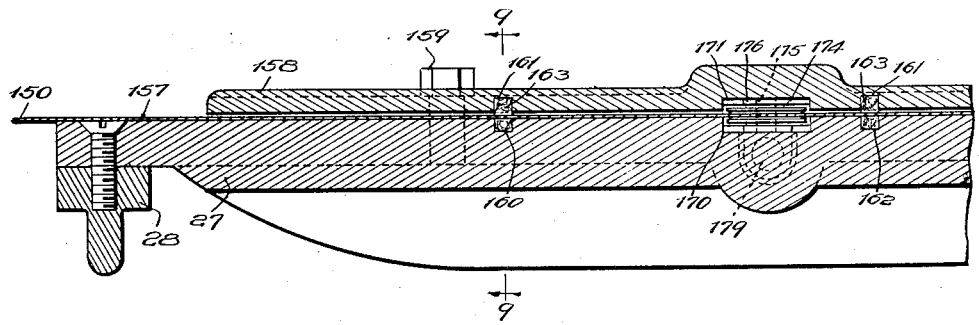
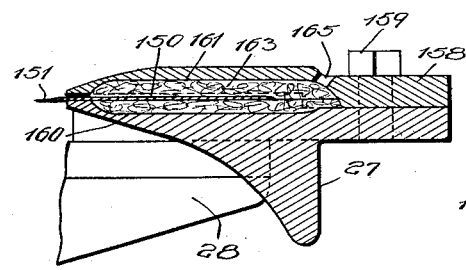
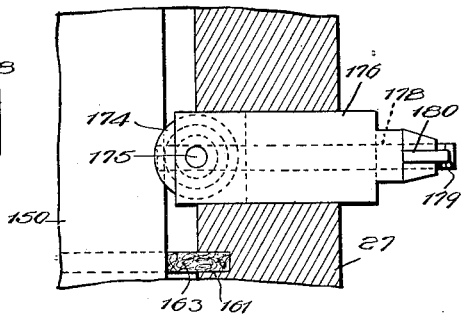
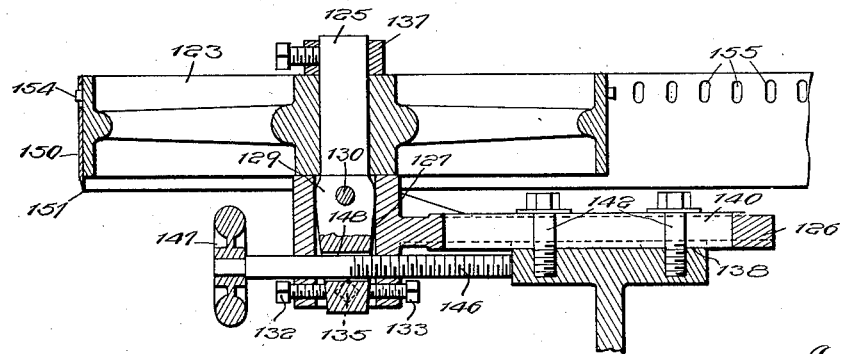
Witness:
William P. Kilroy
Inventor:
John F. Rau
By Hill & Hill
Attys

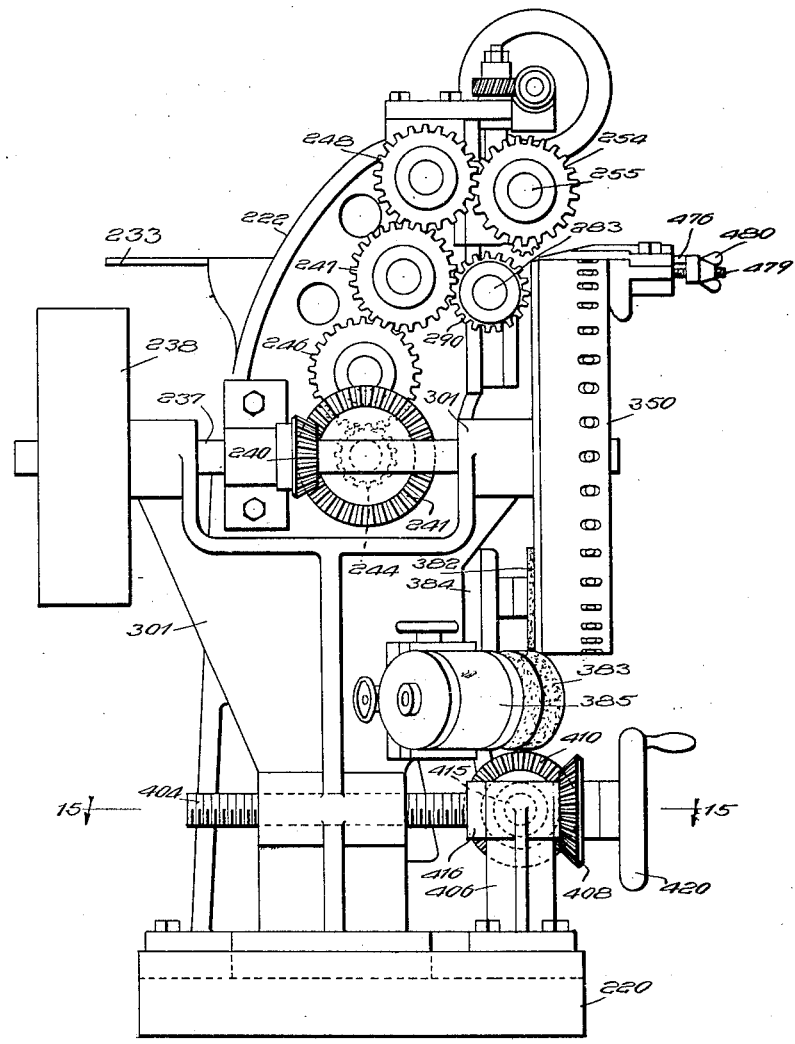

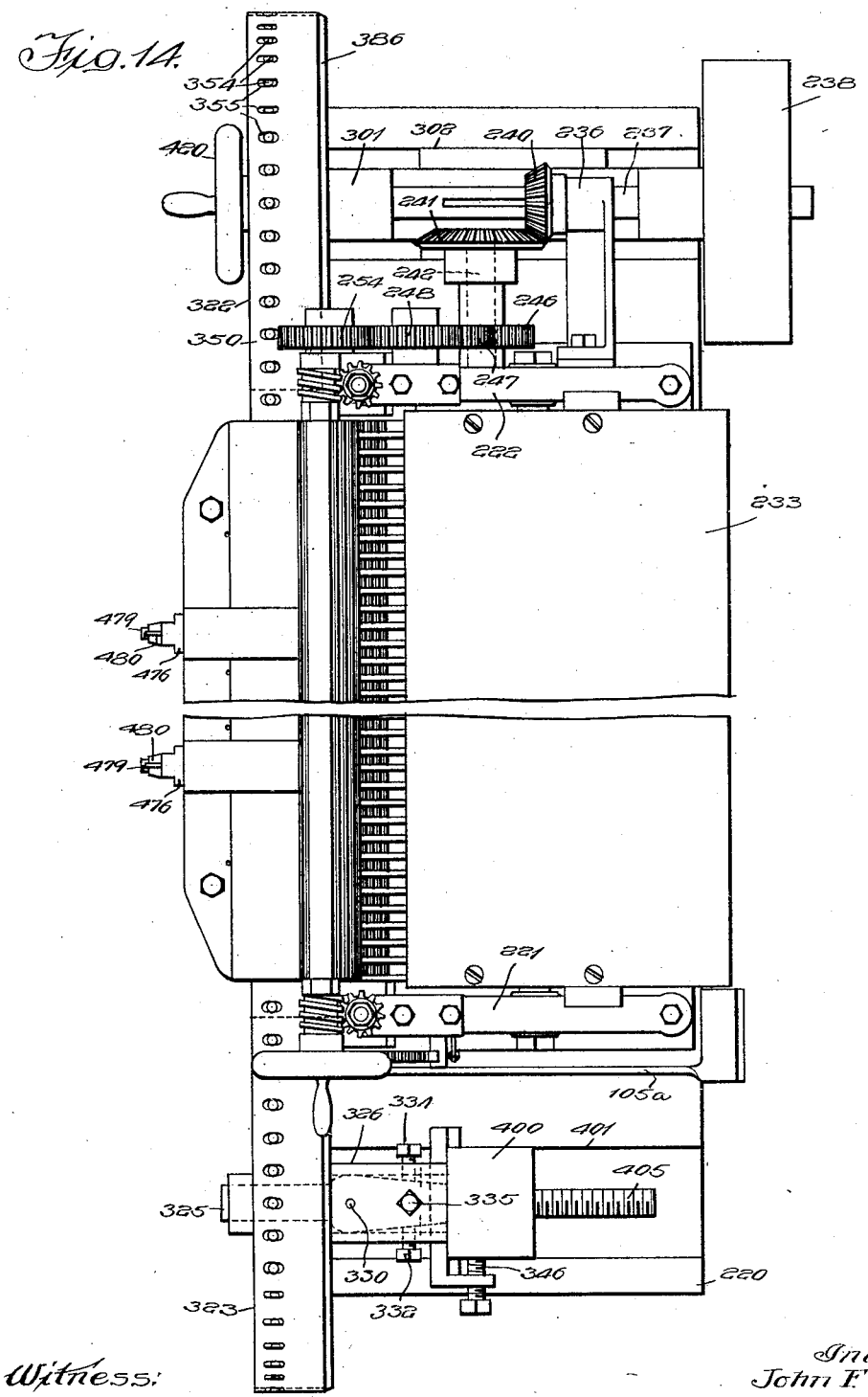

Nov. 17, 1931. J. F. RAU 1,832,424
SKIVING APPARATUS
Filed Sept. 16, 1927 10 Sheets-Sheet 10

Patented Nov. 17, 1931

1,832,424

UNITED STATES PATENT OFFICE

JOHN F. RAU, OF CHICAGO, ILLINOIS

SKIVING APPARATUS

Application filed September 16, 1927. Serial No. 219,960.

My invention relates to skiving apparatus and has among its other objects, the production of apparatus of the kind described which is compact, convenient, durable, efficient and satisfactory for use wherever found applicable.

A particular object of the invention is to provide improved apparatus for skiving rubber tires in such manner that shoes may be manufactured therefrom.

Another particular object of the invention is to provide a skiving machine having feeding means which automatically conforms to the shape of the material being fed.

Apparatus embodying one form of the invention preferably comprises a knife in the form of a driven endless belt which is trained over a pair of pulleys, adjustable means being preferably provided for advancing a tire, which has been previously severed transversely thereof, to the knife so that longitudinal strips will be cut therefrom. The tire feeding mechanism comprises an adjustably mounted gear, or the equivalent, engageable with one side of the tire and a plurality of relatively movable gears, or the equivalent, which are held by spring tension, or the equivalent, in engagement with the other side of the tire, manually operable means being provided to move said plurality of gears away from the first-mentioned gear so that one end of the transversely severed tire may be readily introduced between the first-mentioned gear and said plurality of gears. Then when said plurality of gears are again subjected to the tension of the springs and the apparatus is driven by any suitable means, the first-mentioned gear cooperates with said plurality of gears to advance the tire to the knife which may be brought into adjusted positions with respect to the first-mentioned gear and said plurality of gears to compensate for wear of the knife. The position of the knife is also controlled by angularly displacing one of the pulleys around a pivotal axis which is normal to the axis of rotation of the pulley.

In another form of the invention, the pulleys around which the knife is trained are carried by shafts mounted in brackets which are slidably mounted in the main frame, the arrangement being such that the brackets may be displaced simultaneously to bring the knife into adusted positions with respect to the tire feeding mechanism.

In both forms of the invention illustrated in the accompanying drawings, means is provided for sharpening the knives while the apparatus is in use.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 5 is a section taken on line 5—5 of Fig. 1.

Fig. 6 is a section taken on line 6—6 of Fig. 1;

Fig. 7 is a section taken on line 7—7 of Fig. 5;

Fig. 8 is a section taken on line 8—8 of Fig. 1;

Fig. 9 is a section taken on line 9—9 of Fig. 8;

Fig. 10 is a section taken on line 10—10 of Fig. 5;

Fig. 11 is a section taken on line 11—11 of Fig. 3;

Fig. 12 is a section taken on line 12—12 of Fig. 5;

Fig. 13 is an end elevation of a slicing machine which embodies another form of the invention;

Fig. 14 is a plan view of the improved machine shown in Fig. 13; and

Figure 1:
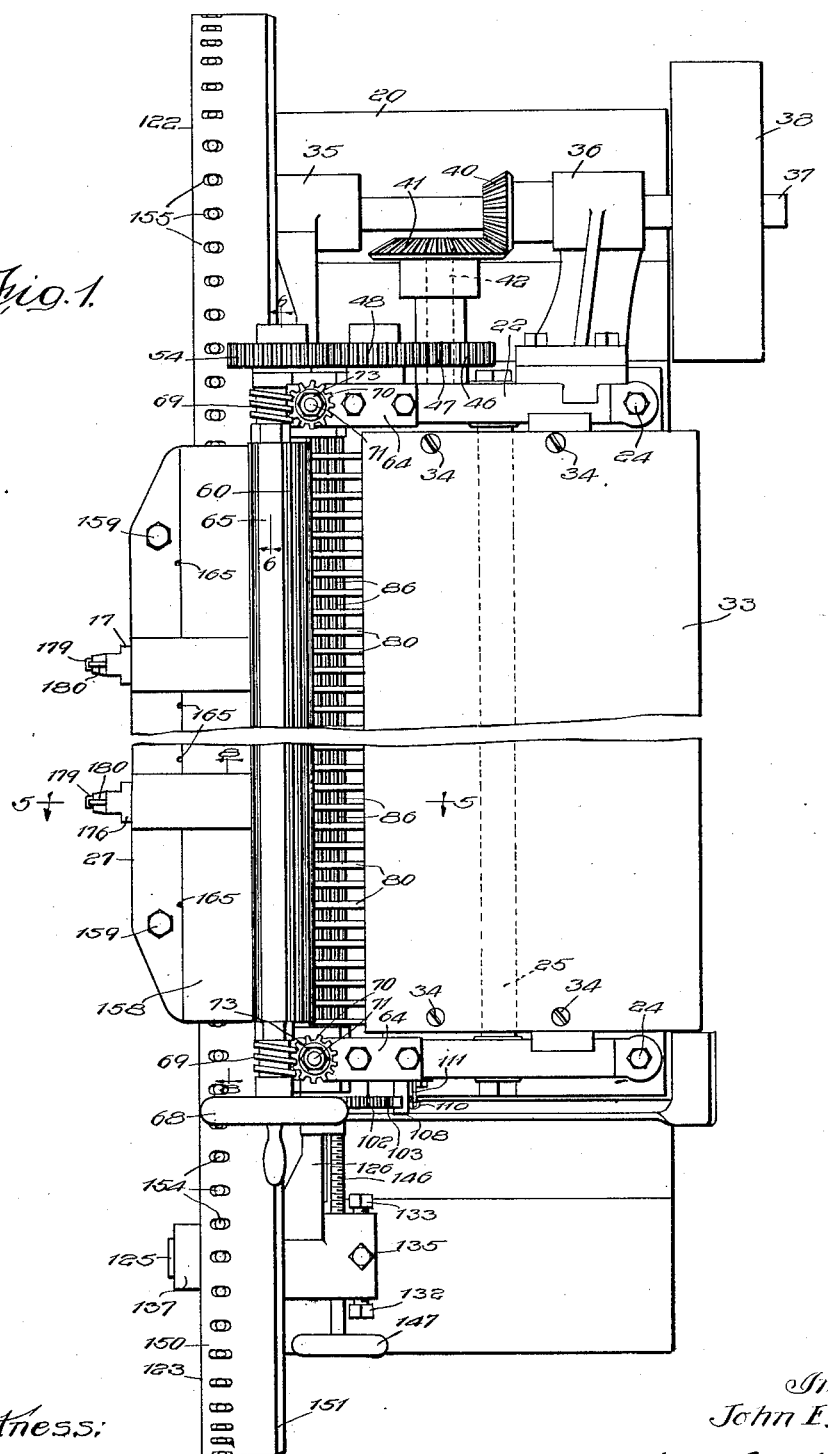
Fig. 1 is a plan view of a slicing machine which embodies the invention.

In the drawings, I have shown the invention embodied in apparatus which is particularly adapted to skive tires so that shoes may be made therefrom but it is to be understood that I am limited to this use only to the extent indicated in the appended claims. Of course, used tires are preferably employed for this purpose as it would not be economical to skive substantially new tires to provide shoes. In practice, the used tire is severed transversely at one point so as to provide a relatively long strip which may be fed endwise into the apparatus.

Referring for the present to Figs. 1 to 12, inclusive, and particularly to Figs. 1 to 4, inclusive, it will be noted that I have provided a suitable frame for the improved apparatus illustrated in Figs. 1 to 12, inclusive. The frame preferably comprises a bed plate or base 20 and side frames 21 and 22 which are rigidly secured by bolts 24, or the equivalent, to the base 20. A tie rod 25 preferably extends between the side frames 21 and 22 and is rigidly secured thereto. At 27, I provide a guide bracket which is preferably rigidly secured to brackets 28, the brackets 28 being rigidly secured to the side frames 21 and 22. The bracket 27 guides a knife which is hereinafter described.

As best shown in Fig. 5, I have provided a transverse frame member 30 which extends between the side frames 21 and 22 and is bolted thereto. Disposed at substantially the same elevation as the guide bracket 27 is a table 33 secured by screws 34, or the equivalent, to the side frames 21 and 22. The purpose of this construction will presently appear.

Rotatably journaled in brackets 35 and 36, which are rigidly secured to the side frame 22, is a shaft 37 and keyed to the shaft 37 is a pulley 38 which may be operatively connected by a belt to any suitable source of power such as a line shaft or a pulley mounted upon the shaft of an electrical motor. Constrained to rotate with the shaft 37 is a bevel gear 40 which meshes with a bevel gear 41 journaled upon a stud shaft 42 mounted in the side frame 22 (see Fig. 4). A pinion 44 constrained to rotate with the bevel gear 41 meshes with a gear 46 and the gear 46 meshes with a gear 47 which in turn meshes with a gear 48, the gears 46, 47 and 48 being journaled upon stud shafts 50, 51 and 52 mounted in the side frame 22. Meshing with the gear 48 is a gear 54 keyed or otherwise secured to a shaft 55 which is rotatably journaled in slides 56 which may be raised or lowered upon ways 57 provided upon the side frames 21 and 22 (see Fig. 12).

Each slide 56 is preferably provided with a recess 58 which accommodates the ways 57 of the associated side frame, and bars or plates 59 are preferably secured to the slide to hold it in place upon the ways. Formed integral with the shaft 55 is a ribbed drive roller 60 which preferably extends from adjacent the side frame 21 to adjacent the side frame 22. Meshing with the roller and gear 60 is a drive roller 63 which is preferably formed integral with a shaft 64 rotatably journaled in the slides 56.

The means for raising and lowering the slides 56 preferably comprises a shaft 65 rotatably journaled in bearing brackets 66 which are rigidly secured to the upper ends of the side frames 21 and 22. A hand wheel 68 is preferably secured to one end of the shaft 65 so that the shaft may be manually rotated and keyed or pinned to the shaft 65 are worms 69 which mesh with worm wheels 70 constrained to rotate with vertically disposed shafts 71, the shafts 71 being rotatably journaled in the bearing brackets 66. As best shown in Fig. 5, longitudinal displacement of each shaft 71 is prevented by a nut 73 screw-threaded upon one end of the shaft and a collar 74 secured to the shaft and arranged to engage the under side of the associated bearing bracket 66. The lower end of each shaft 71 is screw-threaded into one of the slides 56 in such manner that when the shaft 65 is rotated through the medium of the hand wheel 68, the worms 69 will cause the worm gears 70 to rotate the shafts 71 and the shafts 71 will displace the slides 56.

Disposed beneath the roller 63 and aligned therewith are a plurality of rollers 78, each of which rollers 78 is mounted upon a stud shaft 79 preferably formed integral with one of a plurality of levers 80, the levers 80 being mounted upon a shaft 83 which is rotatably journaled in the side frames 21 and 22. It will be noted that the levers 80 are not constrained to rotate with the shaft 83. Meshing with each roller 78 is one of a plurality of gears 86 which is mounted upon the shaft 83 and is constrained to rotate therewith by a pin 89, or the equivalent.

Figure 4:
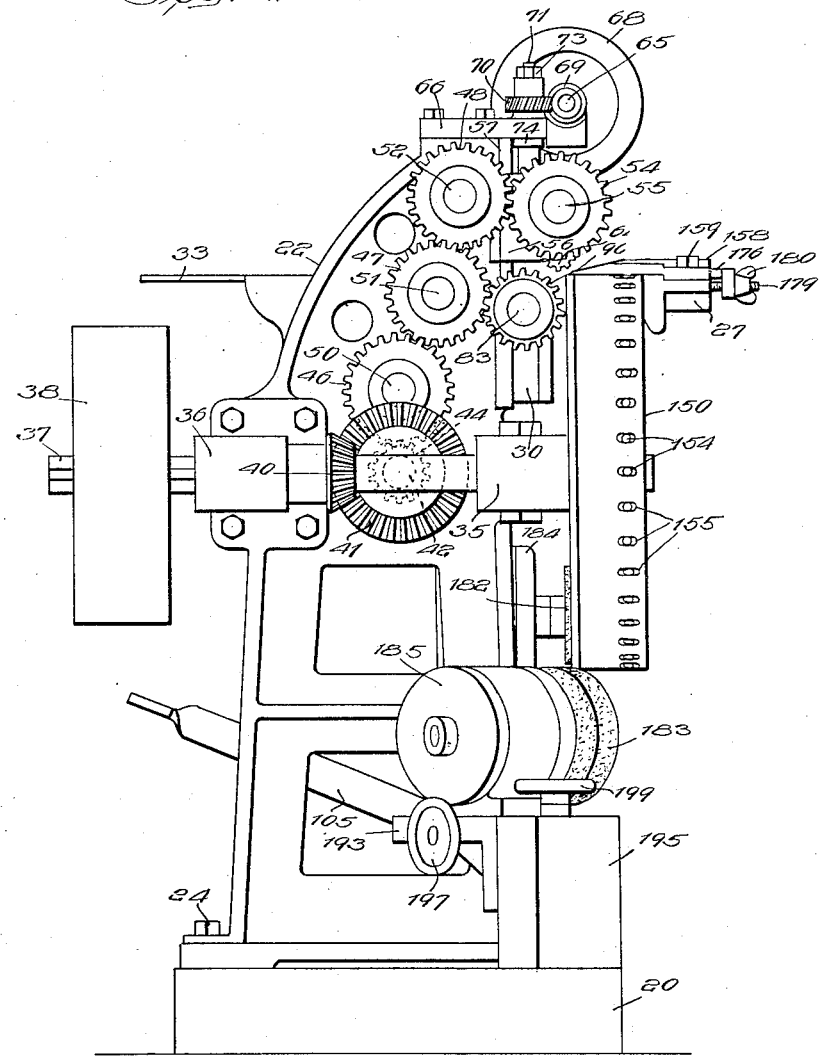
Fig. 4 is an end elevation of the improved slicing machine as it appears when it is viewed from the right of Fig. 2.

Referring now to Fig. 4, it will be noted that a gear 90 keyed or pinned to one end of the shaft 83 meshes with the aforementioned gear 47 so that when the shaft 37 is rotated, the shaft 83 will rotate in synchronism therewith and in synchronism with the aforementioned roller 63. Of course, the feed rollers 78 will also rotate in synchronism with the drive roller 63 and as the diameters of these rollers are substantially identical, the peripheral speeds thereof will also be substantially identical. The arrangement is such that the roller 63 rotates in a counter clockwise direction (Fig. 5) and the rollers 78 rotate in a clockwise direction (Fig. 5). Obviously, if an object is introduced between the rollers and is engaged thereby, the rollers will advance the object to the right (Fig. 5).

Figure 3:
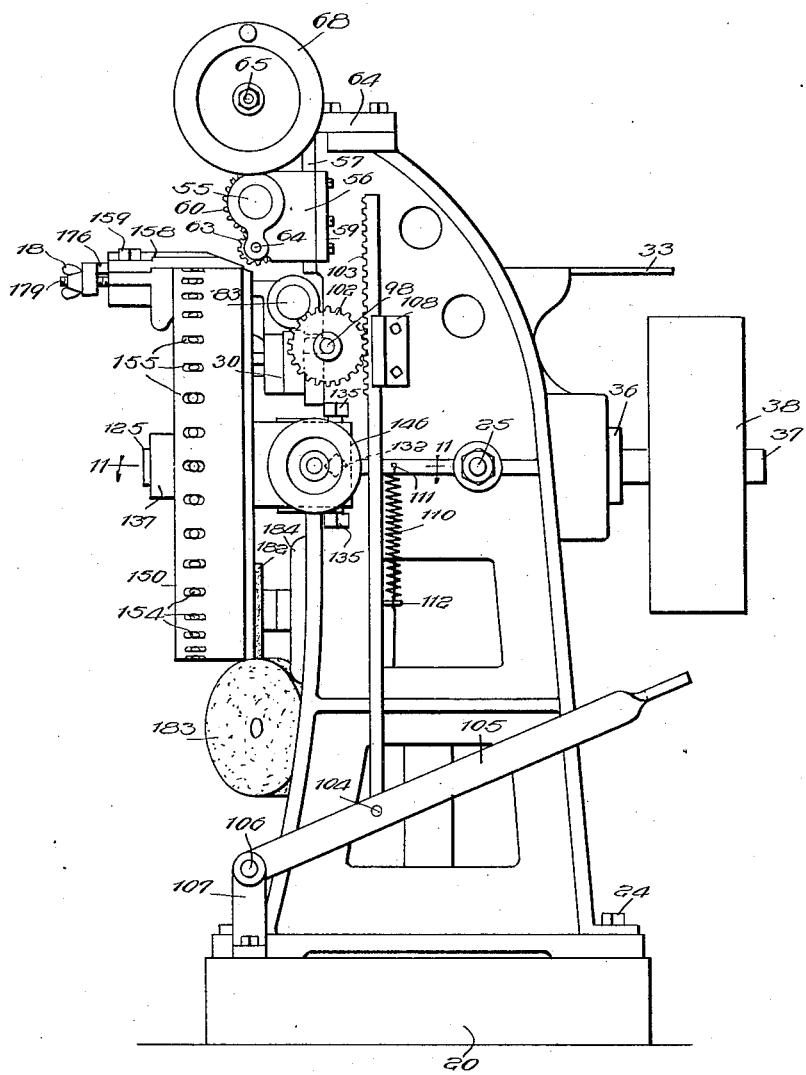
Fig. 3 is an end elevation of the improved slicing machine as it appears when it is viewed from the left of Fig. 2.

Each of the levers 80 is preferably provided with an arcuate surface 94 adapted to ride upon the upper surface of the aforementioned transverse frame member 30 so that when the shaft 83 is subjected to a heavy load through the medium of the roller 78 and the roller 86, the shaft 83 will not flex or bend to any appreciable extent. Each of the levers 80 is also preferably provided with a bearing surface 96 adapted to ride upon a cam or eccentric 97 which is preferably formed integral with a shaft 98 rotatably journaled in the side frames 21 and 22 and in bearing blocks 100 mounted upon the transverse frame member 30. A gear 102 secured to one end of the shaft 98 meshes with a vertically disposed rack 103 which has its lower end pivoted by a pin 104 to a foot treadle 105, the foot treadle 105 being pivoted by a pin 106 to a bracket 107 which is secured to the base 20 (see Fig. 3). The rack 103 is held in engagement with the gear 102 by a guide bracket 108 secured to the side frame 21. A tension spring 110 has one of its ends secured to a pin 111 which projects from the side frame 21 and has its other end secured to a pin 112 which projects from the rack 103, the arrangement being such that the spring 110 normally holds the rack 103 and the foot treadle 105 in the positions wherein they are shown in Fig. 3. When the rack 103 and the foot treadle 105 are in the positions wherein they are shown in Fig. 3, the cam or eccentric 97 occupies the position wherein it permits the roller 78 to lie in close proximity to the roller 63 but it is readily understood that if the foot treadle is depressed, the rack 103 will rotate the gear 102 and the shaft 98 to angularly displace the cam or eccentric 97 in such manner that the lever 80 will move the rollers 78 away from the roller 63. A plurality of tension springs 114 are preferably provided for urging the bearing surfaces 96 against the cam or eccentric 97. Each of the springs 114 has one of its ends secured to one of the levers 80 and has the other of its ends secured to one of a plurality of bolts 115 screw-threaded through an angle bar 117 which is riveted or otherwise secured to bracket bars 118 bolted to the transverse frame member 30. Of course, the bolts 115 may be manipulated to adjust the tension of the springs 114. Lock nuts 120 are preferably provided upon the bolts 115 to secure them in their adjusted positions.

Mounted upon one end of the shaft 37 and constrained to rotate therewith is a pulley 122 which is aligned with a pulley 123 rotatably journaled upon a stud shaft 125 carried by a slide 126 (see Fig. 11). The shaft 125 projects through a bore 127 formed in the slide 126 and is preferably enlarged at one point as indicated at 129 to bear against the cylindrical surface of the bore. A vertically disposed pin 130 driven through the enlarged portion of the shaft 125 pivotally connects the shaft to the slide, the arrangement being such that the shaft may be angularly displaced around the longitudinal axis of the pin 130 to bring the pulley 123 into a plurality of adjusted positions with respect to the pulley 122. The means for angularly displacing the shaft 125 around the longitudinal axis of the pin 130 may be of any suitable construction but I preferably provide bolts 132 and 133 which are screw-threaded into the slide 126 and engage one end of the shaft 125. Obviously, if one of the bolts 132 or 133 is unscrewed a slight distance out of the slide 126 and the other bolt is advanced substantially the same distance, the shaft 125 will be displaced through a corresponding angle around the longitudinal axis of the pin 130. I also preferably provide a plurality of bolts 135 which cooperate with the bolts 132 and 133 to secure the shaft 135 in its adjusted position. It will be noted that the pulley 123 is held in place upon the shaft 125 by a collar 137 which is set-screwed to the shaft.

The slide 126 rides upon a finished surface 138 formed upon the side frame 21 and is provided with a slot 140 which accommodates the shanks of two bolts 142 screw-threaded into the side frame 21, the arrangement being such that the shaft 125 may be displaced bodily toward or away from the shaft 37 if the bolts 142 are first loosened to permit displacement of the slide 126 relative to the side frame 21. Of course, after the shaft 125 has been brought into the desired position, the bolts 142 may be tightened to rigidly secure the slide 126 to the side frame 21.

Figure 2:
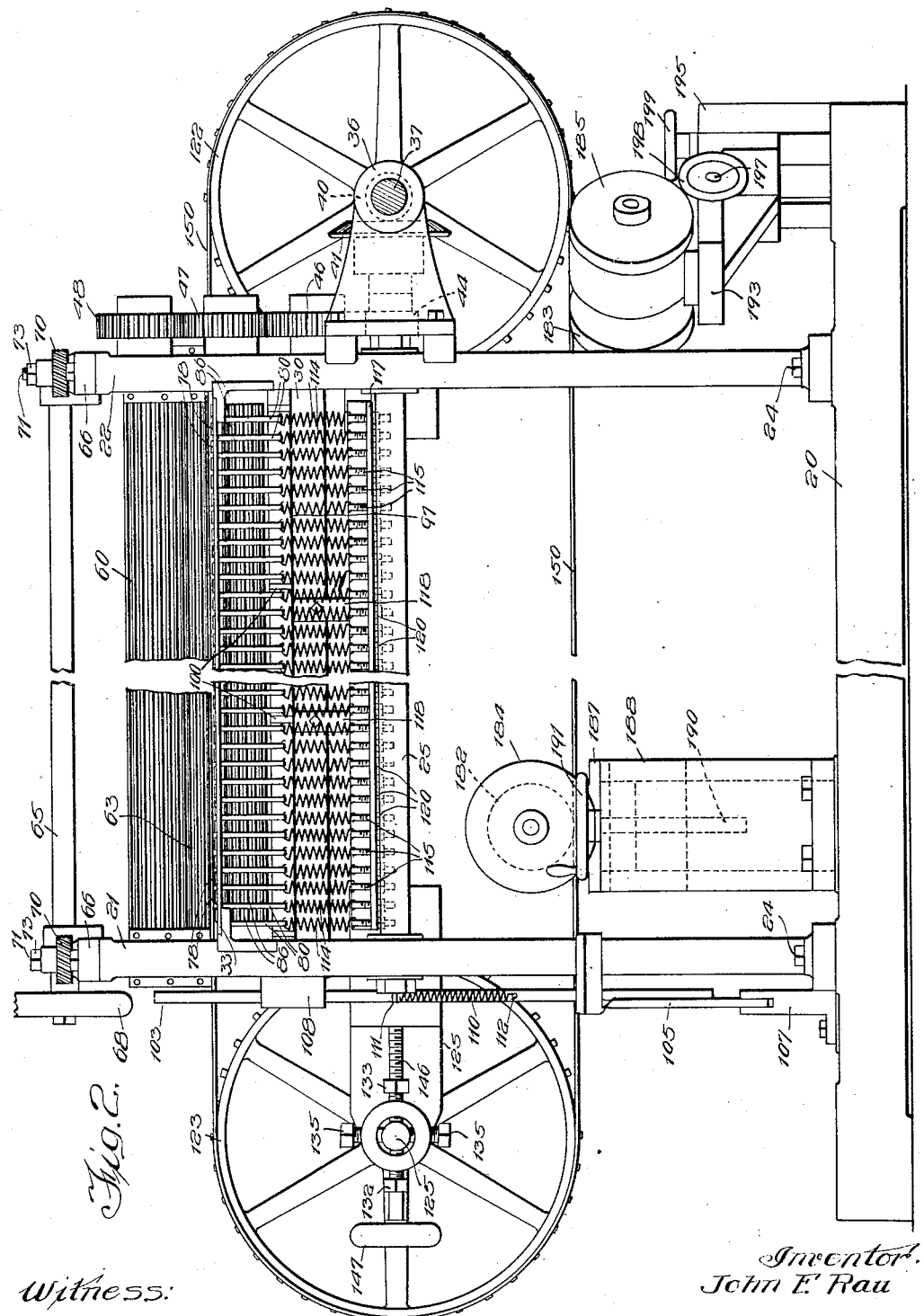
Fig. 2 is a front elevation of the improved slicing machine.

Means is preferably provided for displacing the shaft 125 to the left (Figs. 2 and 11). This means preferably comprises a rod 146 which is screw-threaded through the slide 126 and has one of its ends arranged to abut the side frame 21, the other end of the rod 146 being provided with a hand wheel 147 so that the attendant of the machine may manually rotate the rod. It will be noted that the rod 146 projects through a transverse bore 148 provided in the shaft 125.

Trained over the pulleys 122 and 123 is a knife 150, the knife 150 being preferably in the form of an endless band or belt having a continuous sharpened edge 151 which is employed to slice tires that are advanced to it by the rollers 63 and 78. If so desired, the pulleys 122 and 123 may be provided with teeth or pins 154 arranged to mesh with apertures 155 provided in the knife 150 so that the knife 150 will not slip upon the pulleys.

As best illustrated in Figs. 5, 8 and 9, the guide bracket 27 is provided with a finished surface 157 upon which the knife 150 rides, the knife being retained in place upon the surface 157 by a plate 158 which is secured to the bracket 127 by bolts 159, or the equivalent. The bracket 27 and the plate 158 are provided with a plurality of aligned recesses 160 and 161, respectively, which accommodate strips of felt 163, or the equivalent. The felt 163 is preferably saturated with some suitable lubricant, holes 165 being provided in the plate 158 for this purpose. The bracket 27 and the plate 158 are also provided with a plurality of grooves 170 and 171, respectively, to accommodate grooved pulleys or sheaves 174 upon pins 175, the pins 175 being mounted in substantially L-shaped bars 176. Each L-shaped bar 176 is apertured as at 178 to accommodate a pin 179 which has one of its ends screw-threaded into the bracket 27, a wing nut 180 being screw-threaded upon the other end of the pin and being adapted to be manipulated to urge the associated bar 176 and the associated sheave 174 to the left (Fig. 5). It will be noted that the rear edge of the knife 150 rides in the grooves of the sheaves 174 and that the sheaves prevent the knife 150 from being displaced to the right (Fig. 5). Obviously, when the cutting edge of the knife wears, the wing nuts 180 may be manipulated to displace the knife to the left (Fig. 5) to compensate for such wear. Another function of the sheaves 174 is to prevent the knife 150 from being bent out of shape during the slicing operations.

I preferably provide means for sharpening the knife 150 while the apparatus is in operation. This means preferably comprises an emery wheel 182, or the equivalent, and an emery wheel 183, or the equivalent, the emery wheels 182 and 183 being mounted upon the shafts of electrical motors 184 and 185, respectively, and being arranged to engage the inner and outer surfaces, respectively, of the knife 150. The wheel 183 preferably grinds a beveled edge 186 upon the knife 150 and the wheel 182 is preferably arranged to remove any burr formed on the inner surface of the knife. The motor 184 is preferably mounted upon a table 187 which is slidably mounted in a bracket 188 rigidly secured to the base 20. Means comprising a screw-threaded post 190 and a hand wheel 191 is provided for raising and lowering the motor to bring the wheel 182 into engagement with the inner surface of the knife 150. The motor 185 is preferably mounted upon a table 193 which is slidably mounted upon a bracket 195 rigidly secured to the base 20. Means comprising a screw-threaded rod 197 and a hand wheel 198 are provided for displacing the motor 185 upon the bracket 193 so as to bring the wheel 183 into a plurality of adjusted positions with respect to the knife 150. It will also be noted that I have provided means comprising a hand wheel 199 for raising and lowering the bracket 193 so as to bring the wheel 183 into engagement with the knife 150.

The operation of the above described apparatus is substantially as follows: Assuming that the shaft 37 is being driven through the medium of the pulleys 38 and that a tire has been severed transversely at one point so as to provide a relatively long strip, it is readily understood that one end of this strip may be flattened out sufficiently to be placed upon the table 33 and then advanced to a position where it may be engaged by the rollers 63 and 78. The rollers 63 and 78 will then advance the tire to the knife 150 which will slice the tire and cause one portion thereof to feed upwardly over the plate 158 and cause another portion thereof to feed downwardly underneath the bracket 27. In practice, the tire is preferably fed to the rollers 63 and 78 in such manner that the tread or outer surface of the tire is engaged by the rollers 78 and the inner surface or fabric or cord portion of the tire is engaged by the roller 63. Of course, the rollers 78 assume positions wherein they conform to the shape of the tread surface of the tire. I find it advantageous to depress the foot treadle 105 when one end of a tire strip is to be introduced between the roller 63 and the rollers 78 so that the roller 78 will be moved away from the roller 63. This will provide sufficient room between the roller 63 and the roller 78 so that one end of the strip may be unfolded and quickly and easily inserted between the roller 63 and the rollers 78. Of course, after the forward end of the strip has been inserted between the rollers, the foot treadle is released and the tire strip is advanced to the knife 150. It is readily understood that the relatively heavy load to which the rollers 78 and the shaft 83 are subjected during the feeding operation is transmitted to the transverse frame member 30 through the arcuate surfaces 94 which engage the upper surface of the transverse member 30. The amount of tread material removed from the fabric or cord portion of the tire is determined by the position of the roller 63. Obviously, if it is desired to remove a relatively large amount of tread material, the hand wheel 68 may be rotated to lower the roller 63 and if it is desired to remove a relatively small amount of tread material, the hand wheel 68 may be rotated to raise the roller 63. During each slicing operation each of the rollers 78 aligned with the tire strip is yieldingly held by its associated tension spring 114 in engagement with the tread surface of the tire. The rollers 78 which lie to either side of the tire strip are simply brought into positions wherein the surfaces 96 provided upon their associated levers 80 rest upon the cam or eccentric 97.

If it is desired to align the cutting edge of the knife 150 with the rollers 63 and toothed element 78, the bolts 132 and 133 may be manipulated to angularly displace the shaft 125, the bolts 135 being loosened during this adjustment and being subsequently tightened to lock the shaft 125 in its adjusted position. The wing nuts 180 may be manipulated to advance the cutting edge of the knife 150 toward the table 33. This construction permits the knife to be quickly and easily displaced to take up wear thereof. In the event that the pulleys 122 and 123 are not spaced sufficiently far apart to draw the knife 150 taut, it is readily understood that the bolts 142 may be loosened and the hand wheel 147 may be rotated to cause the threaded pin 146 to displace the slide 126 to the left (Fig. 11) until the knife is drawn substantially taut. The bolts 142 are then preferably tightened to lock the slide 126 in its adjusted position.

The emery wheels 182 and 183 are preferably adjusted from time to time to bring them into effective engagement with the knife 150 so that they will grind the knife while the apparatus is in operation. This is an important feature of my construction as when the emery wheels 182 and 183 are employed to sharpen the knife, it is unnecessary to remove the knife from the machine to permit sharpening thereof.

Figure 15:
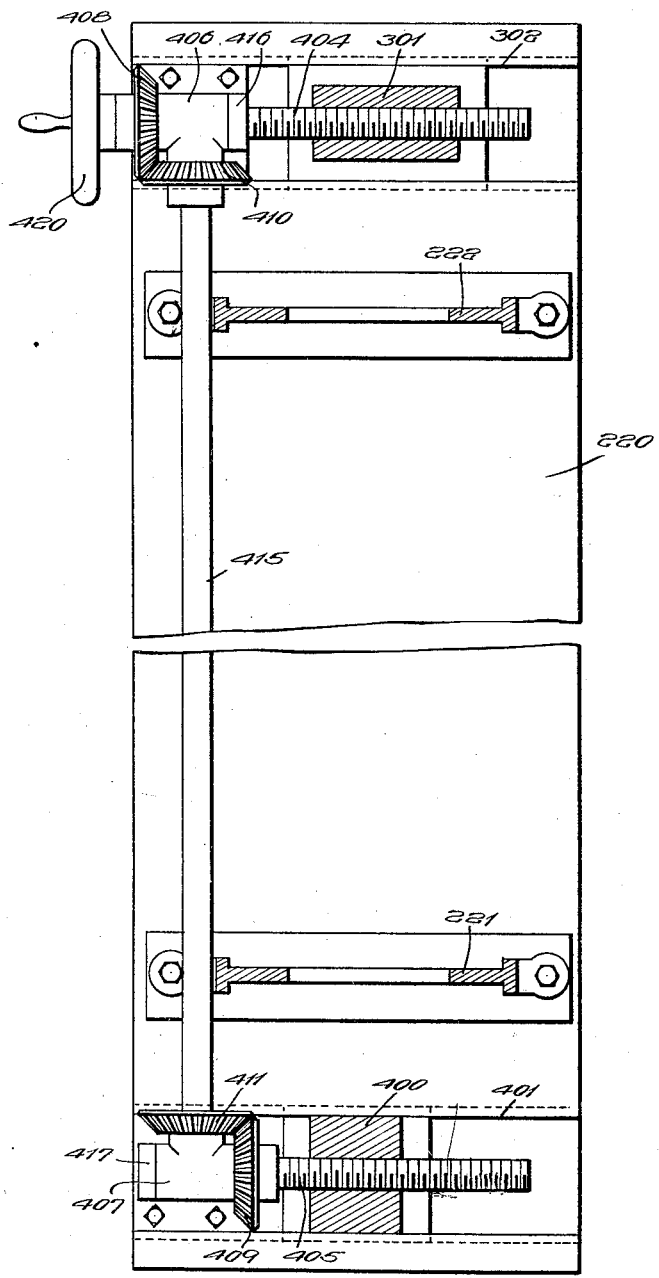
Fig. 15 is a section taken on line 15—15 of Fig. 13.

Referring now to Figs. 13, 14 and 15 wherein I have shown apparatus embodying another form of the invention, the reference character 220 designates a base upon which side frames 221 and 222 are mounted. The side frames 221 and 222 carry a table 233 which corresponds to the aforementioned table 33 and a shaft 237 is rotatably journaled in a bracket 236 rigidly secured to the side frame 222 and in a bracket 301 which is slidably journaled in ways 302 provided in the base 220. A pulley 238 is keyed or otherwise secured to one end of the shaft 237 and a bevel gear 240 is splined to the shaft intermediate its ends and is arranged to mesh with a bevel gear 241 rotatably journaled upon a stud shaft 242 mounted in the side frame 222. A pinion 244 constrained to rotate with the bevel gear 241 meshes with a gear 246 arranged to mesh with a gear 247, the gear 247 being arranged to mesh with a gear 290 and a gear 248. The gear 248 meshes with a gear 254. It will be noted that the gears 254 and 290 correspond with the aforementioned gears 54 and 90, respectively, and that they are adapted to rotate shafts 255 and 283, respectively, which correspond to the aforementioned shafts 55 and 83, respectively. The gears 246, 247 and 248 are mounted upon stud shafts carried by the side frame 222. The mechanism associated with the shafts 255 and 283 is substantially identical with the mechanism associated with the aforementioned shafts 55 and 83, respectively, and for that reason is not shown in detail in Figs. 13, 14 and 15. It is sufficient to state that suitable gears are provided which correspond to the aforementioned rollers 63 and 78 and that these gears are adapted to feed the tire strips to a knife 350 which corresponds to the aforementioned knife 150 and is substantially identical in construction therewith. Thus, the knife 350 is beveled as at 386 and is provided with apertures 355 which are adapted to mesh with pins 354 projecting from pulleys 322 and 323. The pulley 322 is secured to the shaft 237 and the pulley 323 is rotatably journaled upon a shaft 325 which is substantially identical in construction with the aforementioned shaft 225, the shaft 325 being pivoted by a pin 330 in a bracket 326 which is slidably mounted upon a bracket 400, the bracket 400 being slidably journaled in ways 401 provided in the base 220. Bolts 332 and 334 may be manipulated to angularly displace the shaft 325 around the longitudinal axis of the pin 330 to bring the knife 350 into adjusted positions with respect to the feeding mechanism. A bolt 346 screw-threaded into a bracket 326 abuts the bracket 400 and may be manipulated to displace the bracket 326, the shaft 325 and the pulley 323 away from the pulley 322 to tighten the knife 350. It will be noted that bolts 335 are provided, which bolts 335 correspond to the aforementioned bolts 135.

As best shown in Fig. 15, shafts 404 and 405 are screw-threaded into the brackets 301 and 400, respectively, the shafts 404 and 405 being rotatably journaled in brackets 406 and 407, respectively. The brackets 406 and 407 are rigidly secured by bolts, or the equivalent, to the base 220. Keyed or otherwise secured to the shafts 404 and 405 are bevel gears 408 and 409, respectively, which mesh with bevel gears 410 and 411, respectively, the gears 410 and 411 being keyed or otherwise secured to a shaft 415 extending transversely of the machine. In this instance, the ends of the shaft 415 are rotatably journaled in the brackets 406 and 407. Collars 416 and 417 cooperate with the gears 408 and 409, respectively, to prevent longitudinal displacement of the shafts 404 and 405. A hand wheel 420 secured to one end of the shaft 404 provides means whereby the shafts 404 and 405 may be rotated, it being understood that when the shaft 404 is rotated, the shaft 405 will rotate in unison therewith as the motion of the shaft 404 is transmitted to the shaft 405 through the bevel gears 408 and 410, the shaft 415 and through the bevel gears 411 and 409. The construction is such that if the hand wheel 420 is rotated in one direction, it will advance the brackets 301 and 326 to the left (Fig. 15) and if it is rotated in the other direction, it will advance the brackets 301 and 326 to the right (Fig. 15). Of course, when the brackets 301 and 326 are displaced in this manner, the pulleys 322 and 323 and the knife 350 will also be displaced. Obviously, any wear on the knife 350 will be compensated by advancing the knife toward the table 233.

It will be noted that I have provided emery wheels 382 and 383 for sharpening the knife 350. Electrical motors 384 and 385 corresponding to the aforementioned electrical motors 184 and 185 are provided for driving the emery wheels 382 and 383, respectively, the motors 384 and 385 being mounted upon suitable apparatus substantially identical in construction to the apparatus upon which the aforementioned motors 184 and 185 are mounted.

It will be noted that I have provided means comprising a hand wheel 486 for raising and lowering the slides 456 which correspond to the aforementioned slide 56 and that I have provided bolts 479, wing nuts 480 and L-shaped brackets 476 which correspond to the aforementioned bolts 179, the wing nuts 180 and the L-shaped brackets 176, respectively. The L-shaped brackets 476 carry sheaves (not shown) which are preferably identical in construction with the aforementioned sheaves 174 and are adapted to engage the rear edge of the knife 350.

As indicated above, the tire feeding mechanism of the apparatus shown in Figs. 13, 14 and 15 is substantially identical to the tire feeding mechanism shown in the apparatus in Figs. 1 to 12, inclusive, means comprising a foot treadle 105a being provided to displace the gears (not shown) which correspond of the aforementioned rollers 78.

The operation of the apparatus shown in Figs. 13, 14 and 15 is similar to the operation of the apparatus shown in Figs. 1 to 12, inclusive. However, it is readily understood that the hand wheel 420 may be rotated to bring the knife 350 into a plurality of adjusted positions with respect to the feeding mechanism. Thus, when the knife 350 has worn down to such an extent that its cutting edge is spaced too great a distance from the tire feeding mechanism, the hand wheel 420 may be rotated to displace the brackets 301 and 400 to the right (Fig. 14) so as to advance the cutting edge of the knife toward the tire feeding mechanism. Of course, the position of the knife may also be regulated by angularly displacing the shaft 325 and by manipulating the wing nuts 480.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In apparatus of the kind described, a knife, and means for feeding articles to said knife comprising a roller engageable with one side of each article, a plurality of individually pivoted rollers engageable with the other side of each article, and yielding means for urging said individually pivoted rollers into engagement with the articles.

2. In apparatus of the kind described, a knife, and means for feeding articles to said knife comprising a roller engageable with such articles and arranged at one side of said knife, means for bringing said roller into a plurality of adjusted positions with respect to said knife, a plurality of rollers mounted independently of each other engageable with said articles, said last mentioned rollers being arranged upon the opposite side of said knife, means for yieldingly urging said plurality of rollers toward said first-mentioned roller and means for driving said independently mounted rollers to thereby feed articles by means of said rollers.

3. In apparatus of the kind described, a frame, a knife, and means for feeding articles to said knife comprising a driven gear engageable with said articles, and a plurality of gears engageable with said articles, a plurality of levers carrying said plurality of gears, a shaft carrying said levers, said levers being provided with surfaces engageable with said frame to transmit the bending load upon said shaft to the frame, and means for yieldingly urging said plurality of gears toward said first-mentioned gear.

4. In apparatus of the kind described, a frame, a knife, means for feeding articles to said knife comprising a driven gear engageable with said articles, a plurality of gears engageable with said articles, a plurality of levers carrying said plurality of gears, a shaft carrying said levers, said levers being provided with surfaces engageable with said frame to transmit the bending load upon said shaft to the frame, means for yieldingly urging said plurality of gears toward said first-mentioned gear, and means including a cam for displacing said levers to displace said plurality of gears in a direction away from the first-mentioned gear.

5. In apparatus of the class described, a knife in the form of an endless belt, means for feeding articles to the knife comprising ribbed feed rollers, said rollers being adjustable relatively to the cutting edge of the knife and a plurality of toothed elements mounted independently of each other, and resilient means urging said last mentioned elements toward said feed rollers.

6. In apparatus of the class described, a knife in the form of an endless belt, means for feeding articles to the knife including an adjustable ribbed feed roller and a plurality of toothed elements mounted independently of each other, resilient means urging last mentioned elements toward said ribbed feed roller, and means acting on said toothed elements as a unit for varying the distance between said ribbed feed roller and toothed elements.

7. In apparatus of the class described, a knife in the form of an endless belt, means for feeding articles to the knife including an adjustable feed roller and a plurality of feed rollers mounted independently of each other, resilient means urging said last-mentioned feed rollers toward said first-mentioned feed roller, and foot operable means acting on said last-mentioned feed rollers as a unit for varying the distance between said feed rollers and said first-mentioned feed roller.

8. In apparatus of the class described, a knife in the form of an endless belt, means for feeding articles to the knife including an adjustable feed roller and a plurality of co-operating feed rollers, levers upon which said feed rollers are respectively mounted, resilient means urging said levers and feed rollers toward said first-mentioned feed roller, and foot operable means comprising an eccentric shaft acting on said levers as a unit for varying the distance between said feed rollers and said first-mentioned feed roller.

9. In apparatus of the class described, a pair of pulleys, a knife in the form of an endless belt trained over said pulleys, a slidable bracket carrying each pulley, a threaded member engaging each bracket, and manually operable means for rotating said threaded members simultaneously to move said pulleys in unison along their axes.

10. In a machine of the character described, the combination of feed rolls adapted to engage an article to feed the article to a knife, a knife to which said rolls feed said article, one of said feed rolls having longitudinally extending circumferentially arranged toothed portions, a longitudinally extending toothed member cooperating with said feed roll having said toothed portions to thereby drive said roll and provide a feed for said material.

11. In a machine of the character described, the combination of feed rolls adapted to engage an article to feed the article to a knife, a knife to which said article is fed by said rolls, one of said feed rolls having longitudinally extending circumferentially arranged toothed portions, a longitudinally extending toothed member cooperating with said feed roll having said toothed portions to thereby drive said roll and provide a feed for said material, and means for moving said feed roll and member as a unit relatively to the other of said feed rolls.

12. In a machine of the character described, the combination of feed rolls adapted to engage an article to feed the article to a knife, a knife to which said article is fed by said rolls, one of said feed rolls being comprised of a plurality of independently movable driven elements, said feed rolls including a roll having longitudinally extending toothed portions, a longitudinally extending member having toothed portions arranged to engage the toothed portions of said second mentioned roll to thereby drive and provide feeding material by said roll.

13. In a machine of the character described, the combination of feed rolls adapted to engage an article to feed the article to a knife, a knife to which said article is fed by said rolls one of said feed rolls being comprised of a plurality of independently movable driven elements, said feed rolls including a roll having longitudinally extending toothed portions, a longitudinally extending member having toothed portions arranged to engage the toothed portions of said second mentioned roll to thereby drive and provide for feeding material by said roll and means for moving said feed roll and member as a unit relatively to said independently movable driven elements.

In testimony whereof, I have hereunto signed my name.

JOHN F. RAU.